(12) United States Patent
Zhou et al.

(10) Patent No.: US 10,622,171 B1
(45) Date of Patent: Apr. 14, 2020

(54) LIGHT GUIDING KEY STRUCTURE AND ELECTRONIC DEVICE INCLUDING THE SAME

(71) Applicant: NANNING FUGUI PRECISION INDUSTRIAL CO., LTD., Nanning (CN)

(72) Inventors: Dong-Bo Zhou, Nanning (CN); Bo Jiang, Nanning (CN)

(73) Assignee: NANNING FUGUI PRECISION INDUSTRIAL CO., LTD., Nanning (CN)

(*) Notice: Subject to any disclaimer, the term of this patent is extended or adjusted under 35 U.S.C. 154(b) by 0 days.

(21) Appl. No.: 16/239,572

(22) Filed: Jan. 4, 2019

(30) Foreign Application Priority Data

Oct. 31, 2018 (CN) .......................... 2018 1 1290361

(51) Int. Cl.
*H01H 13/83* (2006.01)
*G06F 3/02* (2006.01)
*G02B 5/22* (2006.01)
*F21V 8/00* (2006.01)

(52) U.S. Cl.
CPC ............... *H01H 13/83* (2013.01); *G02B 5/22* (2013.01); *G02B 6/0071* (2013.01); *G06F 3/0202* (2013.01); *H01H 2219/062* (2013.01)

(58) Field of Classification Search
CPC ............. H01H 13/83; H01H 2219/062; G02B 6/0071; G02B 5/22; G06F 3/0202
See application file for complete search history.

(56) References Cited

U.S. PATENT DOCUMENTS

| 2007/0205088 | A1* | 9/2007 | Lee | H01H 13/83 200/314 |
| 2008/0087533 | A1* | 4/2008 | Choi | H01H 13/83 200/311 |
| 2014/0132539 | A1* | 5/2014 | Huang | G06F 1/1692 345/173 |

FOREIGN PATENT DOCUMENTS

| CN | 2632830 Y | 8/2004 |
| TW | M311998 | 5/2007 |
| TW | 200929298 A | 7/2009 |
| TW | 201135783 A | 10/2011 |
| TW | 201705170 A | 2/2017 |

* cited by examiner

*Primary Examiner* — Donald L Raleigh
(74) *Attorney, Agent, or Firm* — ScienBiziP, P.C.

(57) ABSTRACT

A light guiding key comprises a light emitting assembly, a switch assembly, a light shielding assembly, a light guiding member, a light transmitting member, and a light shielding film. Simultaneous and regional display of multiple colors of light on the same key area are carried out by the light guiding key. The light emitting assembly comprises a first light emitting member and a second light emitting member. The switch assembly comprises a switch for controlling whether the second light emitting member emits light and a button for pressing the switch. The light shielding assembly and the button enclose a first light channel and a second light channel which are isolated from each other. The present disclosure also provides an electronic device comprising the light guiding key structure.

20 Claims, 8 Drawing Sheets

LIGHT GUIDING KEY STRUCTURE AND ELECTRONIC DEVICE INCLUDING THE SAME

FIELD

The disclosure generally relates to light guiding keys.

BACKGROUNDING

Electronic devices such as mobile phones, routers, and set-top boxes are mostly provided with key structures, and are usually designed to have keys with light guiding effects. However, the lighting effects of the existing key structures are single, and it is difficult to realize simultaneous and regional display of lights of different colors.

Therefore, there is room for improvement within the art.

BRIEF DESCRIPTION OF THE DRAWING

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connecting. The connecting can be such that the objects are permanently connected or releasably connected.

Figure 1:
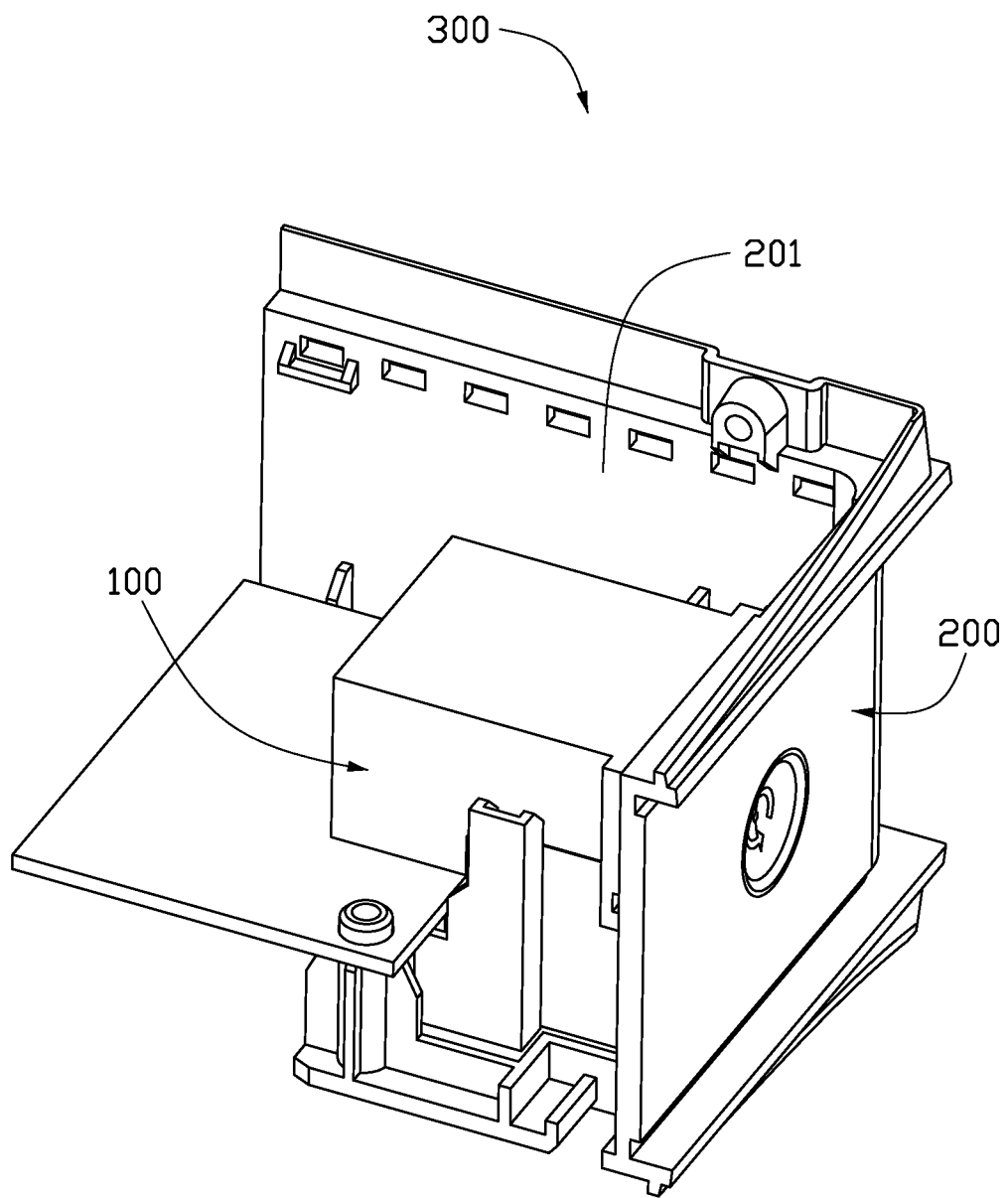
FIG. 1 is a perspective view of part of an electronic device in accordance with an embodiment of the present disclosure.

Referring to FIG. 1, an embodiment of the present disclosure provides an electronic device 300 including a housing 200 and a light guiding key structure 100. The housing 200 has a hollow structure and includes a receiving cavity 201. The light guiding key structure 100 is received in the receiving cavity 201 and fixed to the housing 200.

Figure 2:
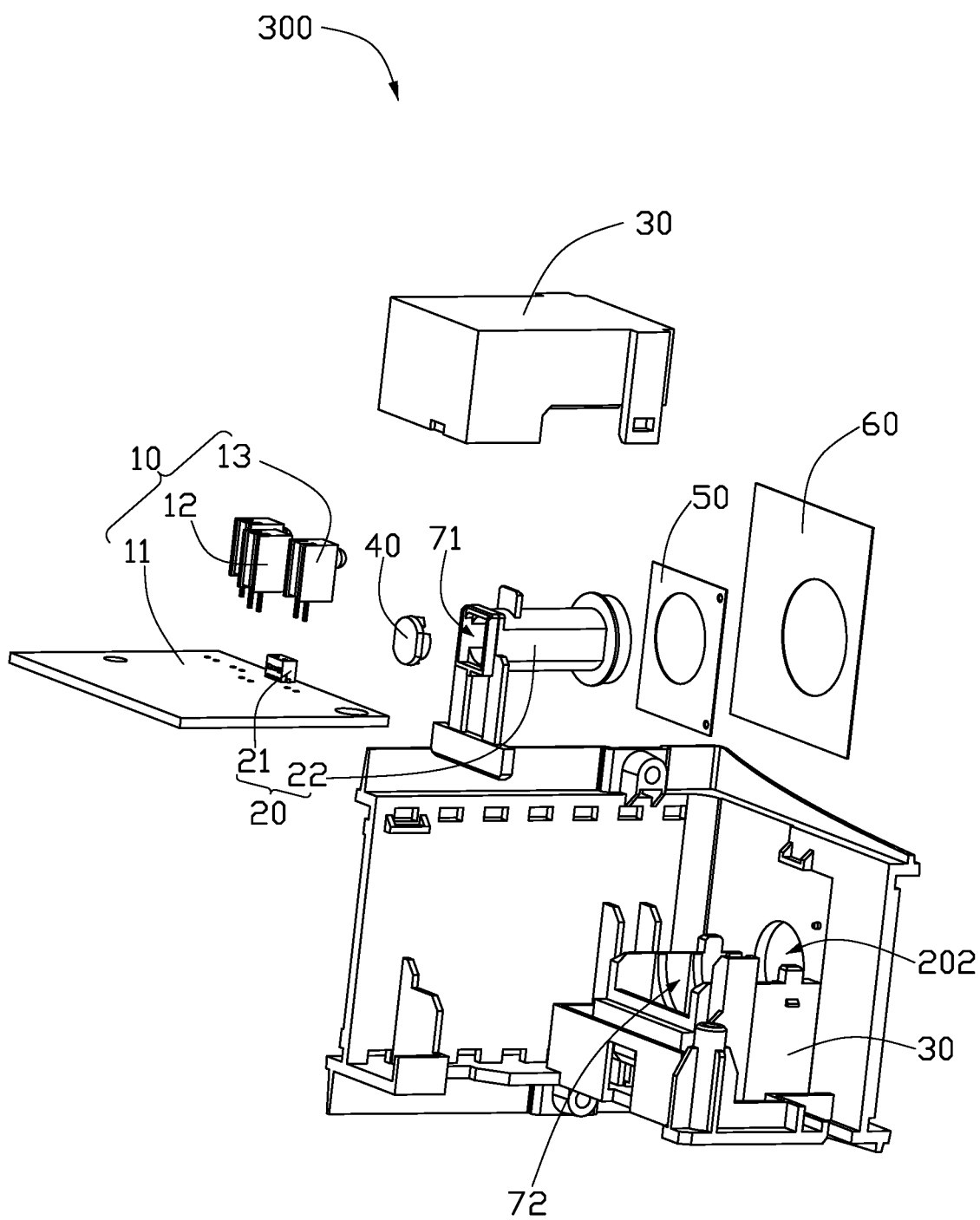
FIG. 2 is an exploded perspective view of part of the electronic device as shown in FIG. 1.

Referring to FIG. 2, the light guiding key structure 100 includes a light emitting assembly 10, a switch assembly 20, a light shielding assembly 30, a light guiding member 40, a light transmitting member 50, and a light shielding film 60.

In the present embodiment, the light emitting assembly 10 includes a circuit board 11, a first light emitting member 12, and a second light emitting member 13. The first light emitting member 12 and the second light emitting member 13 are electrically connected to the circuit board 11. Colors of light emitted by the first light emitting member 12 and the second light emitting member 13 are different.

In other embodiments, the light emitting assembly 10 can include more than two light emitting members to emit more than two different colors of light.

The switch assembly 20 includes a switch 21 for controlling whether the second light emitting member 13 emits light and a button 22 for pressing the switch 21. Specifically, the housing 200 defines a button hole 202. One end of the button 22 is received in the button hole 202, and the other end of the button 22 is located toward the switch 21. Therefore, when the end of the button 22 that is adjacent to the button hole 202 is pressed, the other end of the button 22 contracts the switch 21.

The light shielding assembly 30 and the button 22 enclose a first light channel 71 and a second light channel 72, and the first light channel 71 and the second light channel 72 are isolated from each other. The first light channel 71 is used for passing light emitted by the first light emitting member 12 and the second light channel 72 is used for passing light emitted by the second light emitting member 13.

Figure 3:
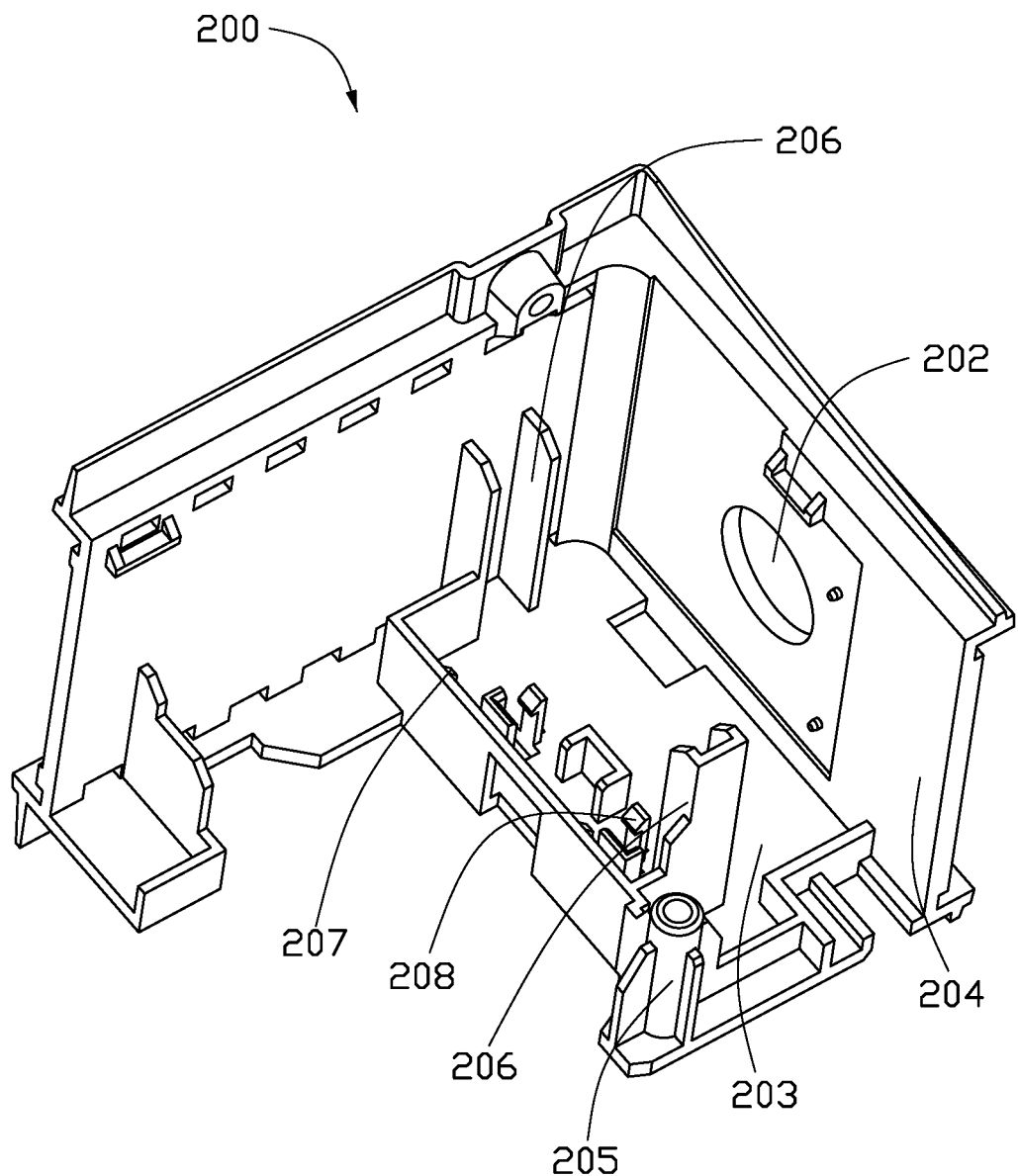
FIG. 3 is a perspective view of a housing of the electronic device as shown in FIG. 1.

Referring to FIG. 3, the housing 200 includes a bottom wall 203 and a side wall 204 extended from an edge of the bottom wall 203. The bottom wall 203 and the side wall 204 enclose the receiving cavity 201. The button hole 202 is defined on the side wall 204.

In the present embodiment, the housing 200 further includes a limiting column 205, a rib 206, a first limiting buckle 207, and a second limiting buckle 208. The limiting column 205, the rib 206, the first limiting buckle 207 and the second limiting buckle 208 protrude from the bottom wall 203 or from the side wall 204 toward the receiving cavity 201. The limiting column 205 is used to fix the circuit board 11 to the housing 200. The rib 206 and the first limiting buckle 207 are used to fix the light shielding assembly 30 to the housing 200.

Figure 4:
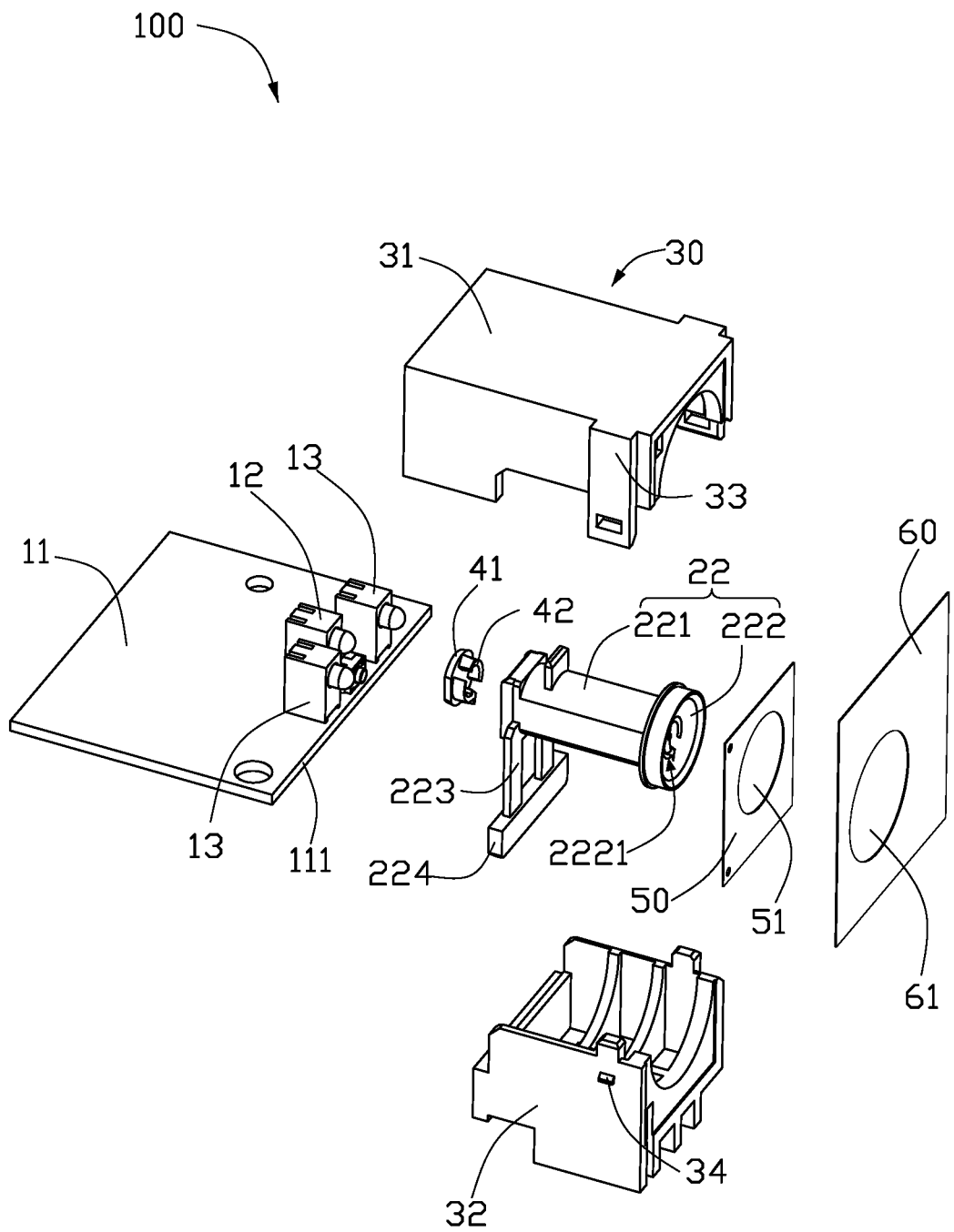
FIG. 4 is an exploded perspective view of a light guiding structure of the electronic device as shown in FIG. 1.

Referring to FIG. 4, the button 22 includes a body 221, a pressing portion 222, a resilient arm 223, and a limiting base 224. In the present embodiment, the body 221 has a hollow structure and includes two open ends. The body 221 is received in the light shielding assembly 30, the inner surface of the body 221 encloses the first light channel 71, and the outer surface of the body 221 encloses the second light channel 72 with the light shielding assembly 30.

The pressing portion 222 is located at one end of the body 221 and is received in the button hole 202. One end of the resilient arm 223 is connected to the body 221, and the other end is connected to the limiting base 224. The limiting base 224 is fixed by the second limiting buckle 208. When the button 22 is pressed, a force is applied to the pressing portion 222 to move the body 221 toward the switch 21 and press the switch 21. When the switch 21 is pressed by the body 221, the resilient arm 223 is deformed by a pulling force of the body 221. The deformed resilient arm 223 generates an elastic restoring force to the body 221, so that the button 22 rebounds.

In the present embodiment, the light shielding assembly 30 includes a first light shielding member 31 and a second light shielding member 32. The button 22 is received between the first light shielding member 31 and the second light shielding member 32. One of the first light shielding member 31 and the second light shielding member 32 is provided with a latching arm 33, and the other is provided with a latching protrusion 34. The latching arm 33 and the latching protrusion 34 can be a snap-together fit. It can be understood that the snap fit of the first light shielding member 31 and the second light shielding member 32 facilitates the installation and removal of the button 22.

The pressing portion 222 defines a light hole 2221. The light guiding member 40 includes a substrate 41 and a light guiding protrusion 42 extended from the substrate 41. The shape and the size of the light guiding protrusion 41 correspond to the light hole 2221. The substrate 41 is received in the first light channel 71 and abuts against the pressing portion 222. The light guiding protrusion 42 is fitted into the light hole 2221.

The body 221 and the pressing portion 222 are made of opaque materials, so that the light emitted by the first light emitting member 12 passes through the light hole 2221 and the light guiding protrusion 42 only.

In the present embodiment, the light transmitting member 50 is a light diffusing film, the light diffusing film and the light shielding film 60 are sequentially sleeved outside the pressing portion 222. Specifically, the light shielding film 60 abuts against the side wall 204 of the housing 200, and the light diffusing film is located on one side of the light shielding film 60 away from the side wall 204. The light diffusing film defines a through hole 51, and the light shielding film 60 defines a via hole 61. The shape and the size of the through hole 51 correspond to the pressing portion 222. The area of the via hole 61 is larger than that of the through hole 51.

In the present embodiment, the body 221 has a shape of cylinder, the pressing portion 222 has a shape of circle, the through hole 51 has a shape of circle equal in size to that of the pressing portion 222. The via hole 61 has a shape of circle and is larger in area than that of the through hole 51. The pressing portion 222, the through hole 51, and the via hole 61 are coaxially positioned.

Figure 5:
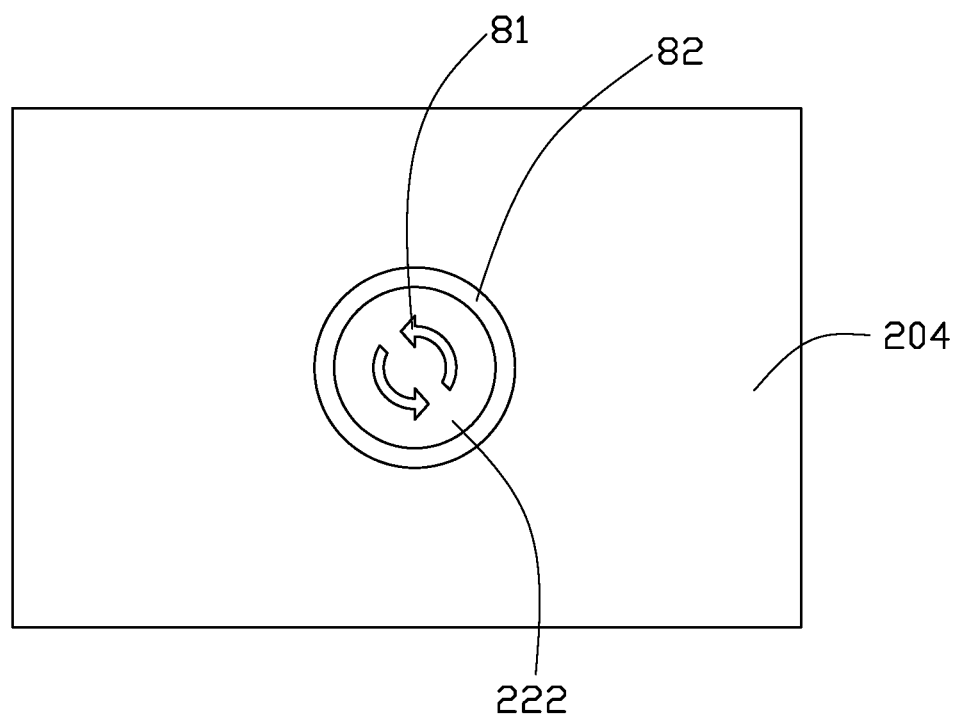
FIG. 5 is a schematic plan view of a first light pattern and a second light pattern of the electronic device as shown in FIG. 1.

Referring to FIG. 5, the light emitted by the first light emitting member 12 enters the first light channel 71 and passes through the light guiding member 40 to form a first light pattern 81 at the pressing portion 222. The light emitted by the second light emitting member 13 enters the second light channel 72 and passes through the light transmitting member 50, the light shielding film 60, and the side wall 204 of the housing 200 to form a second light pattern 82 at edge of the pressing portion 222.

In the present embodiment, the light shielding film 60 is a mylar film, in other embodiments, the light shielding film 60 can also be an opaque tape attached to the side wall 204.

In the present embodiment, the first light emitting member 12 and the second light emitting member 13 are both light-emitting diodes. The first light emitting member 12 emits light when the electronic device 300 is powered on, and the second light emitting member 13 emits light when the button 22 is pressed.

The first light emitting member 12 is located at one open end of the body 221 away from the pressing portion 222. The second light emitting member 13 is closer than the first emitting member 12 to a side edge 111 of the circuit board 11 adjacent to the switch assembly 20. Therefore, the light emitted by the first light emitting member 12 and the light emitted by the second light emitting member 13 are not mixed. The light emitted from the first light emitting member 12 passes through the first light channel 71 instead of passing through the second light channel 72, and the light emitted from the second light emitting member 13 passes through the second light channel 72 instead of passing through the first light channel 71.

When the electronic device 300 is powered on but the button 22 is not pressed, only the first light emitting member 12 emits light and forms the first light pattern 81 on the pressing portion 222. When the electronic device 300 is powered on and the button 22 is pressed to activate the function corresponding to the button 22, not only does the first light emitting member 12 continue to emit light which forms the first light pattern 81 on the pressing portion 222, but the second light emitting member 13 also emits light which forms the second light pattern 82 on the edge of the pressing portion 222.

It should be noted that the light shielding assembly 30 can be a split structure including the first light shielding member 31 and the second shielding member 32. In other embodiments, the light shielding member 30 can also be a unitary structure to make internal connections more reliable and avoid light leakage. In addition, the method of fixing the first shielding member 31 and the second shielding member 32 together by the latching arm 33 and the latching protrusion 34 can be other fixing method.

In the present embodiment, the light shielding assembly 30 and the button 22 enclose the first light channel 71 and the second light channel 72 which are separated from each other to pass the light emitted by the first light emitting member 12 and the second light emitting member 13. In other embodiments, the light shielding assembly 30 and the button 22 can enclose three or more light channels that are isolated from each other to pass lights of greater color variation, thereby realizing simultaneous and regional display of multiple colors of lights on the same button 22.

Figure 6:
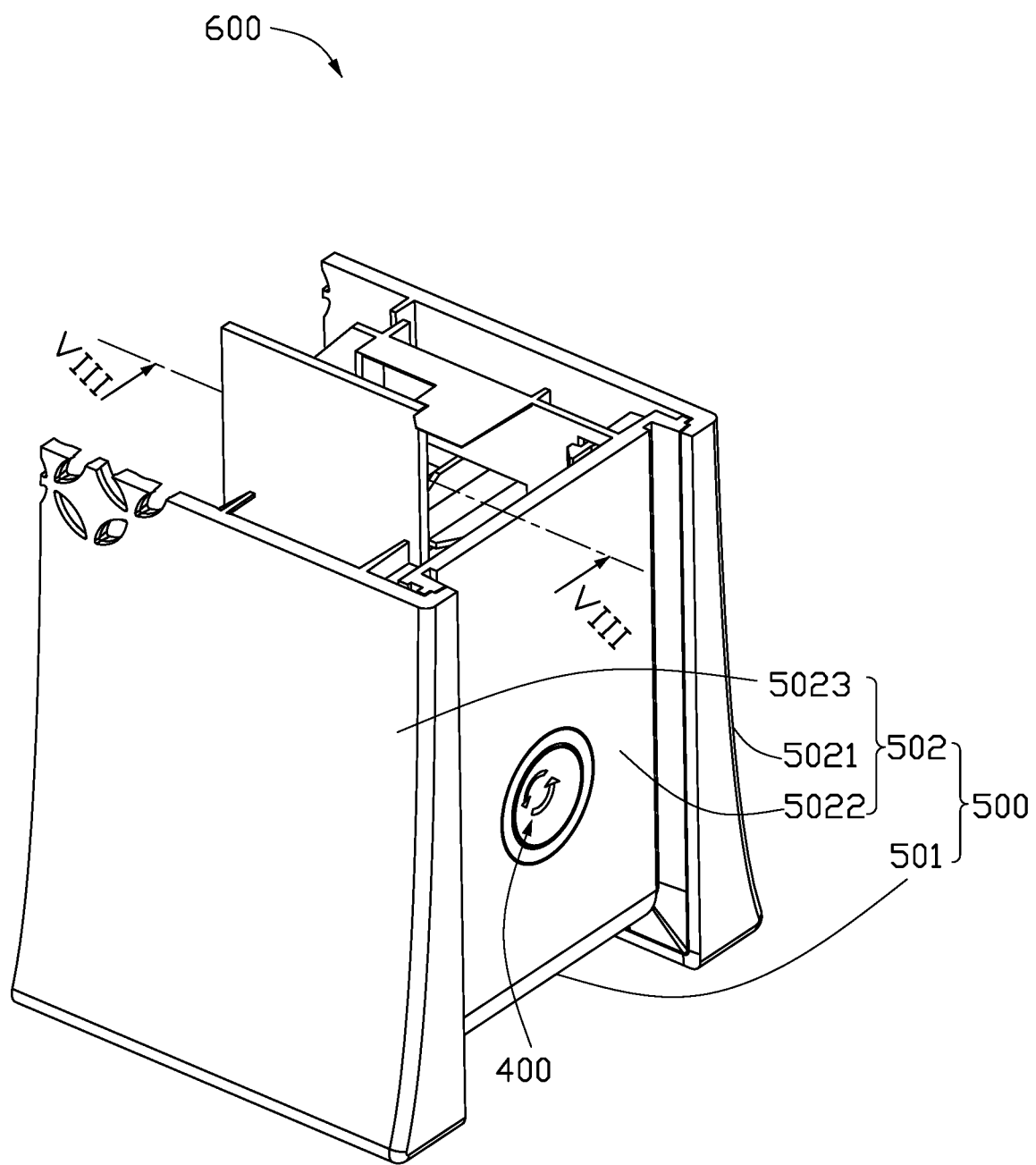
FIG. 6 is a perspective view of part of an electronic device in accordance with another embodiment of the present disclosure.
Figure 7:
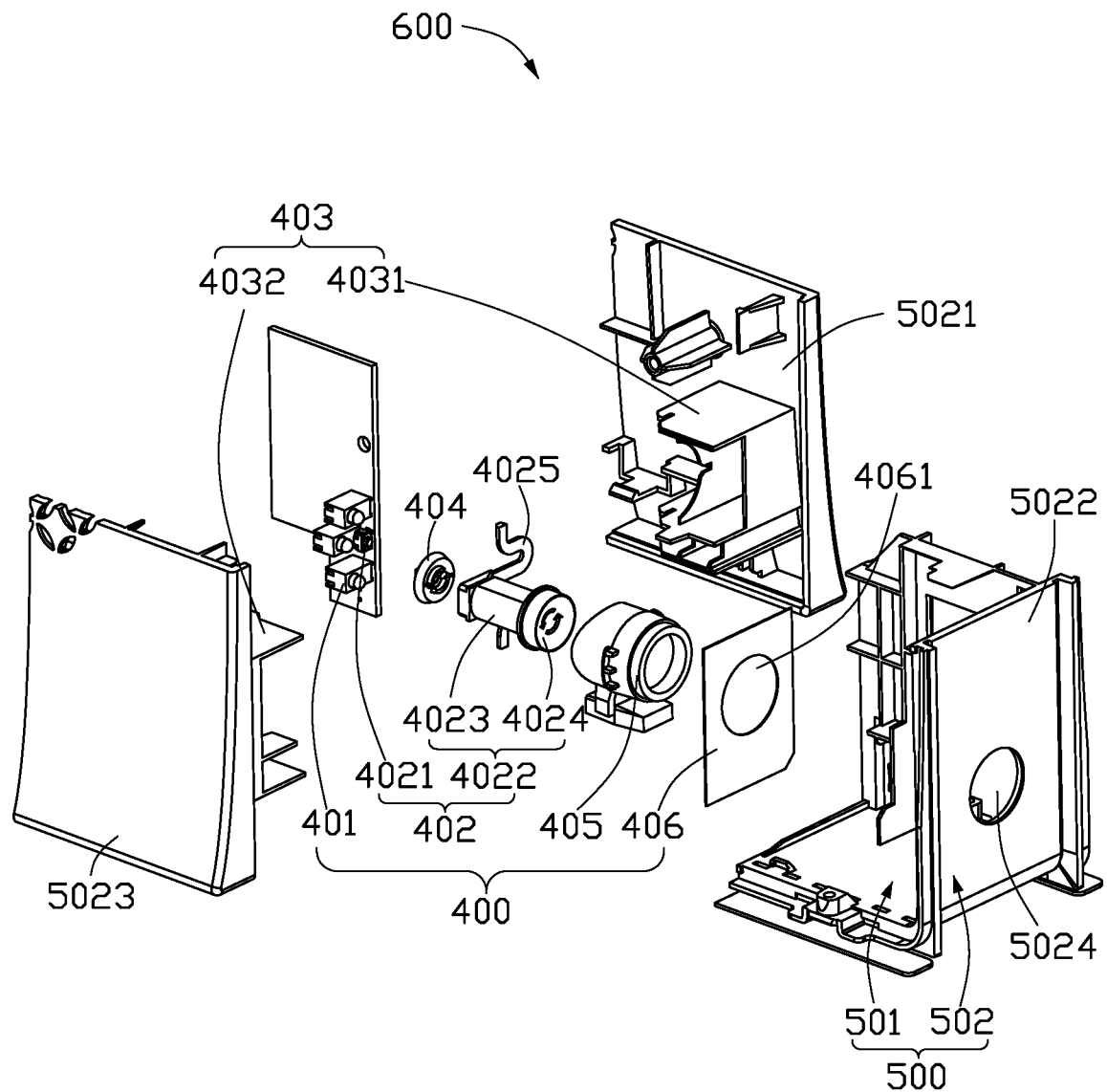
FIG. 7 is an exploded perspective view of part of the electronic device as shown in FIG. 6.
Figure 8:
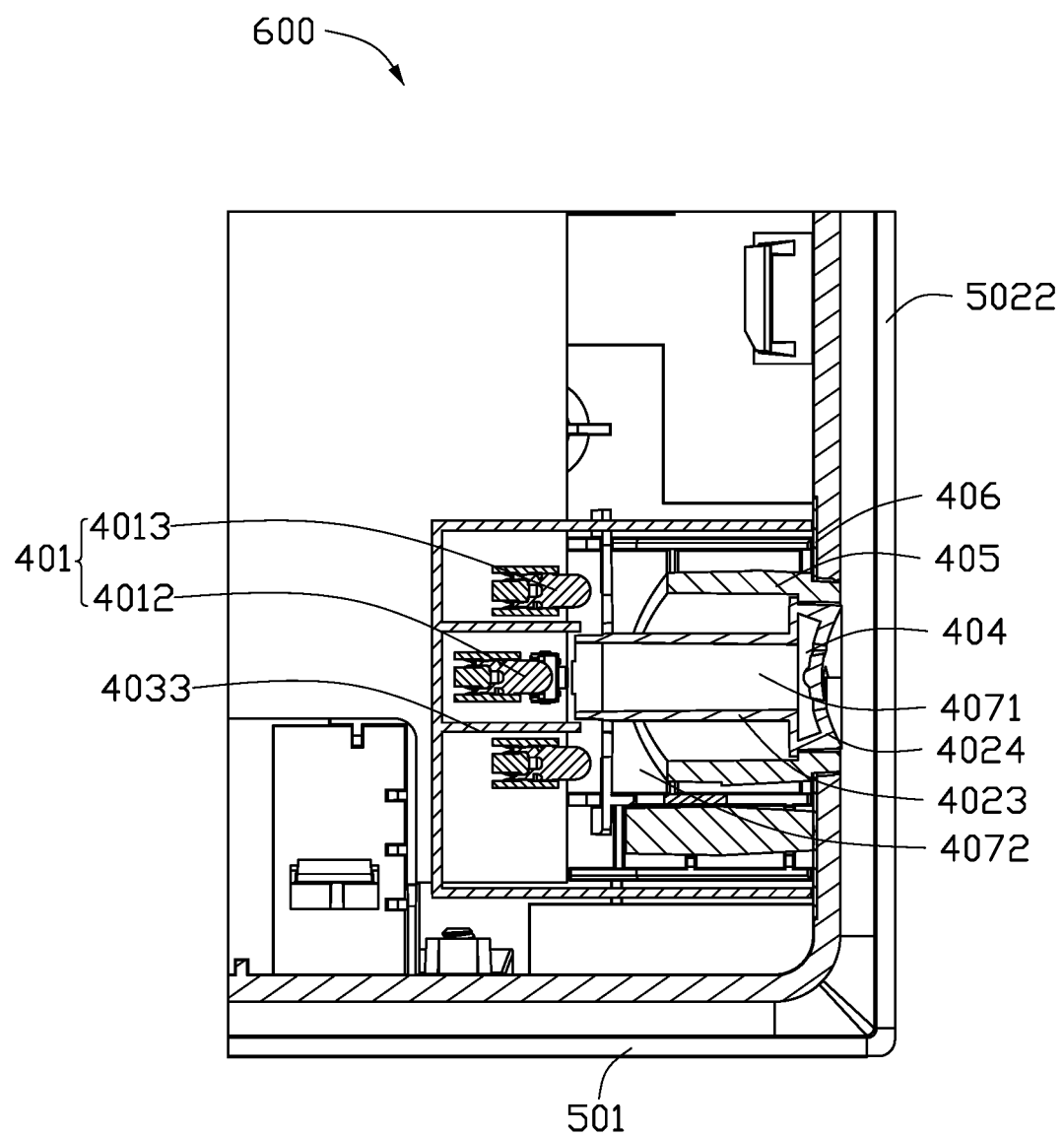
FIG. 8 is a cross-sectional view along line VIII-VIII of FIG. 6.

Referring to FIG. 6, FIG. 7, and FIG. 8, another embodiment of the present disclosure provides an electronic device 600 comprising a housing 500 and a light guiding key structure 400. The light guiding key structure 400 provided by the present embodiment is substantially the same as the light guiding key structure 100 provided in the previous embodiment.

The light guiding key 400 also includes a light emitting assembly 401, a switch assembly 402, a light shielding assembly 403, a light guiding member 404, a light transmitting member 405, and a light shielding film 406. The light emitting assembly 401 includes a first light emitting member 4012 and a second light emitting member 4013 for emitting light of different colors. The switch assembly 402 includes a switch 4021 and a button 4022. The button 4022 includes a body 4023, a pressing portion 4024, and a resilient arm 4025, and the pressing portion 4024 and the resilient arm 4025 are located at two ends of the body 4023. The light shielding assembly 403 includes a first light shielding member 4031 and a second light shielding member 4032. The light shielding assembly 403 and the button 4022 enclose a first light channel 4071 and a second light channel 4072 which are isolated from each other.

Other parts of the light guiding key structure 400 provided by the present embodiment are identical to the light guiding key structure 100 provided by the previous embodiment are not described again for purpose of brevity.

The difference between the light guiding key structure 400 provided by the present embodiment and the light guiding key structure 100 provided in the previous embodiment includes that the resilient arm 4025 has a shape of S for increasing its length and thereby improving elastic performance. It should be noted that one end of the resilient arm 4025 is connected to the body 4023, the other end is fixed by the housing 500 or the light shielding assembly 403.

The difference between the light guiding key structure 400 provided by the present embodiment and the light guiding key structure 100 provided in the previous embodiment further includes that the first light shielding member 4031 and the second light shielding member 4032 are formed integrally with the housing 500. Specifically, the housing 500 includes a bottom wall 501 and a side wall 502 extended from edge of the bottom wall 501. The side wall 502 includes a first surface 5021, a second surface 5022, and a third surface 5023, which are sequentially adjacent to each other. The first light shielding member 4031 is integrally formed with the first surface 5021, and the second shielding member 4032 is integrally formed with the third surface 5023.

It can be understood that the integral structure of the first light shielding member 4031, the second light shielding member 4032 and the housing 500 facilitates the fixing of the first light shielding member 4031, and production cost can be saved.

The difference between the light guiding key structure 400 provided by the present embodiment and the light guiding key structure 100 provided in the previous embodiment further includes that the light transmitting member 405 is a light guiding tube instead of the light diffusing film. The light guiding tube has a shape of cylinder. The light guiding tube is located in the second light channel 4072 and is sleeved outside the button 4022. In the present embodiment, the light between the body 4023 of the button 4022 and the light guiding tube is blocked by the periphery of the pressing portion 4024.

As shown in FIG. 8, the first light emitting member 4012 and the second light emitting member 4013 are separated from each other by a baffle 4033 surrounding the body 4023. The baffle 4033 can be extended by the light shielding assembly 403. Therefore, the light emitted by the first light emitting member 4012 and the light emitted by the second light emitting member 4013 are not mixed. The light emitted from the first light emitting member 4012 passes through the first light channel 4071 instead of passing through the second light channel 4072, and the light emitted from the second light emitting member 4013 passes through the second light channel 4072 instead of passing through the first light channel 4071.

Specifically, the light shielding film 406 defines a via hole 4061, and the second surface 5022 defines a button hole 5024. Ends of the light guiding tube and the button 4022 adjacent to the pressing portion 4024 penetrate the via hole 4061 and are received in the button hole 5024.

In the present embodiment, the side wall 502 is made of an opaque material because using the light guiding tube instead of the light diffusion film as the light transmitting member 405 can eliminate the limitation that the side wall 204 needs to be a translucent material. In addition, the light guiding tube can penetrate into the second light channel 4072 to avoid the light emitting surface being too far away from the light source to poorly transmit light.

The embodiments shown and described above are only examples. Many details are often found in the art such as the other features of a control circuit. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. A light guiding key structure, comprising:
a light emitting assembly comprising a circuit board, a first light emitting member and a second light emitting member, the first light emitting member and the second light emitting member being electrically connected to the circuit board and used to emit light of different colors;
a switch assembly comprising a switch for controlling whether the second light emitting member emits light and a button for pressing the switch;
a light shielding assembly, the light shielding assembly and the button cooperatively enclosing a first light channel and a second light channel isolated from the first light channel;
a light guiding member;
a light transmitting member; and
a light shielding film;
wherein, the light emitted by the first light emitting member enters the first light channel and passes through the light guiding member to form a first light pattern on the button, and the light emitted by the second light emitting member enters the second light channel and passes through a light transmitting region formed by the light transmitting member and the light shielding film to form a second light pattern at edge of the button.

2. The light guiding key structure as claimed in claim 1, wherein the button comprises a body with a hollow structure and a pressing portion located on one side of the body away from the switch, the body is received in the light shielding assembly, and the inner surface of the body encloses the first light channel and the outer surface of the body encloses the second light channel with the light shielding assembly.

3. The light guiding key structure as claimed in claim 2, wherein the pressing portion defines a light hole; the light guiding member comprises a light guiding protrusion having a shape corresponding to the light hole, and the light guiding protrusion is fitted into the light hole.

4. The light guiding key structure as claimed in claim 3, wherein the light guiding member further comprises a substrate and the light guiding protrusion is extended from the substrate, and the substrate is received in the first light channel and abuts against the pressing portion.

5. The light guiding key structure as claimed in claim 2, wherein the button further comprises a resilient arm and a limiting base, and one end of the resilient arm is connected to the body and the other end is connected to the limiting base; the limiting base is fixed to enable the button to have a function of rebounding after pressing.

6. The light guiding key structure as claimed in claim 2, wherein the light transmitting member is a light diffusing film and defines a through hole; the light shielding film defines a via hole, and the light transmitting member and the light shielding film are sequentially sleeved outside the pressing portion.

7. The light guiding key structure as claimed in claim 6, wherein the pressing portion has a shape of circle, the through hole has a shape of circle equal in size to that of the pressing portion, the via hole has a shape of circle and is larger in area than that of the through hole, and the through hole and the via hole are coaxially positioned.

8. The light guiding key structure as claimed in claim 2, wherein the light transmitting member is a light guiding tube, the light guiding tube is located in the second light channel and is sleeved outside the button; the light shielding film defines a via hole, and ends of the light guiding tube and the button that is adjacent to the pressing portion penetrate the via hole.

9. The light guiding key structure as claimed in claim 1, wherein the light shielding assembly comprises a first light shielding member and a second light shielding member, one of the first light shielding member and the second light shielding member is provided with a latching arm and the other is provided with a latching protrusion, and the latching arm and the latching protrusion are snap-fitted.

10. An electronic device, comprising:
a housing having a receiving cavity; and
a light guiding key structure received in the receiving cavity and comprising:
  a light emitting assembly comprising a circuit board, a first light emitting member and a second light emitting member, the first light emitting member and the second light emitting member being electrically connected to the circuit board and used to emit light of different colors;
  a switch assembly comprising a switch for controlling whether the second light emitting member emits light and a button for pressing the switch;
  a light shielding assembly, the light shielding assembly and the button cooperatively enclosing a first light channel and a second light channel isolated from the first light channel;
  a light guiding member;
  a light transmitting member; and
  a light shielding film;
  wherein, the light emitted by the first light emitting member enters the first light channel and passes through the light guiding member to form a first light pattern on the button, and the light emitted by the second light emitting member enters the second light channel and passes through a light transmitting region formed by the light transmitting member and the light shielding film to form a second light pattern at edge of the button.

11. The electronic device as claimed in claim 10, wherein the button comprises a body with a hollow structure and a pressing portion located on one side of the body away from the switch, the body is received in the light shielding assembly, and the inner surface of the body encloses the first light channel and the outer surface of the body encloses the second light channel with the light shielding assembly.

12. The electronic device as claimed in claim 11, wherein the pressing portion defines a light hole; the light guiding member comprises a light guiding protrusion having a shape corresponding to the light hole, and the light guiding protrusion is fitted into the light hole.

13. The electronic device as claimed in claim 12, wherein the light guiding member further comprises a substrate and the light guiding protrusion is extended from the substrate, and the substrate is received in the first light channel and abuts against the pressing portion.

14. The electronic device as claimed in claim 11, wherein the button further comprises a resilient arm and a limiting base, and one end of the resilient arm is connected to the body and the other end is connected to the limiting base; the limiting base is fixed to enable the button to have a function of rebounding after pressing.

15. The electronic device as claimed in claim 11, wherein the light transmitting member is a light diffusing film and defines a through hole; the light shielding film defines a via hole, and light transmitting member and the light shielding film are sequentially sleeved outside the pressing portion.

16. The electronic device as claimed in claim 15, wherein the pressing portion has a shape of circle, the through hole has a shape of circle equal in size to that of the pressing portion, the via hole has a shape of circle and is larger in area than that of the through hole, and the through hole and the via hole are coaxially positioned.

17. The electronic device as claimed in claim 11, wherein the light transmitting member is a light guiding tube, the light guiding tube is located in the second light channel and is sleeved outside the button; the light shielding film defines a via hole, and ends of the light guiding tube and the button that is adjacent to the pressing portion penetrate the via hole.

18. The electronic device as claimed in claim 10, wherein the light shielding assembly includes a first light shielding member and a second light shielding member, one of the first light shielding member and the second light shielding member is provided with a latching arm and the other is provided with a latching protrusion, and the latching arm and the latching protrusion are snap-fitted.

19. The electronic device as claimed in claim 11, wherein the housing defines a button hole, and the pressing portion is received in the button hole.

20. The electronic device as claimed in claim 11, wherein the housing comprises a bottom wall, a side wall, a limiting column, a rib, a first limiting buckle and a second limiting buckle; the side wall is extended from edge of the bottom wall and defines the button hole; the limiting column, the rib, the first limiting buckle and the second limiting buckle protrude from the bottom wall or from the side wall toward the receiving cavity and are used to fix the circuit, the light shielding assembly and the button.

* * * * *